United States Patent [19]
Takiguchi

[11] Patent Number: 5,876,304
[45] Date of Patent: Mar. 2, 1999

[54] UP-SHIFT CONTROL APPARATUS TO PREVENT ENGINE RACING BY INCREASING THE BACK PRESSURE OF AN ACCUMULATOR OF AUTOMATIC TRANSMISSION

[75] Inventor: Masahiro Takiguchi, Shizuoka, Japan

[73] Assignee: JATCO Corporation, Fuji, Japan

[21] Appl. No.: 898,355

[22] Filed: Jul. 22, 1997

[30] Foreign Application Priority Data

Jul. 31, 1996 [JP] Japan .................................. 8-202237

[51] Int. Cl.$^6$ ................................................. F16H 61/08
[52] U.S. Cl. ........................ 477/150; 477/151; 477/154; 477/155
[58] Field of Search .................................. 477/143, 149, 477/150, 151, 154, 155, 156

[56] References Cited

U.S. PATENT DOCUMENTS

| | | | |
|---|---|---|---|
| 4,843,922 | 7/1989 | Kashihara | 477/150 X |
| 5,018,068 | 5/1991 | Aoki et al. | 477/154 X |
| 5,125,295 | 6/1992 | Iwatsuki et al. | 477/150 |
| 5,128,868 | 7/1992 | Imai et al. | 477/155 X |
| 5,138,906 | 8/1992 | Iwatsuki et al. | 477/150 X |
| 5,182,970 | 2/1993 | Goto et al. | 477/151 |

FOREIGN PATENT DOCUMENTS

5-248526  9/1993  Japan .

*Primary Examiner*—Khoi Q. Ta
*Attorney, Agent, or Firm*—Foley & Lardner

[57] ABSTRACT

An up-shift control apparatus includes an engine racing detecting means for detecting engine racing during an up-shift and an engine racing preventing means. The up-shift control apparatus is installed to an automatic transmission which executes the up-shift by disengaging a first friction element and by engaging a second friction element. The engine racing preventing means outputs a command signal to a valve actuator to temporally increase an engagement force of the first friction element when the engine racing is detected during the up-shift.

6 Claims, 7 Drawing Sheets

|  | REV/C | HIGH/C | 2-4/B | LOW/C | L&R/B | LOW O.W.C |
|---|---|---|---|---|---|---|
| 1st |  |  |  | ○ | ○ | ◍ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

| GEAR POSITION \ SOLENOID | SHIFT SOLENOID (A) | SHIFT SOLENOID (B) |
|---|---|---|
| 1st SPEED | ○ | ○ |
| 2nd SPEED | × | ○ |
| 3rd SPEED | × | × |
| 4th SPEED | ○ | × |

{ ○ ON (DRAIN CIRCUIT CLOSED CONDITION)
{ × OFF (DRAIN CIRCUIT OPEN CONDITION)

UP-SHIFT CONTROL APPARATUS TO PREVENT ENGINE RACING BY INCREASING THE BACK PRESSURE OF AN ACCUMULATOR OF AUTOMATIC TRANSMISSION

BACKGROUND OF THE INVENTION

The present invention relates to improvements in an up-shift control apparatus of an automatic transmission, and more particularly to a control of an accumulator back pressure of a friction element to be disengaged in an up-shift transient time.

Japanese Patent Provisional Publication No. 5-248526 discloses a shift change control apparatus of an automatic transmission. When 3-4 up-shift is executed, an improper overlap between a discharging pressure of the low clutch 50 to be disengaged and a charging pressure of the band brake 28 to be engaged invites engine racing or falling of the output shaft torque. Therefore, this conventional apparatus is arranged to provide a low clutch sequence valve 90 for switching the back pressure of a low clutch accumulator 83 from a supply side to a drain side so as to synchronize the charging pressure and the discharging pressure.

Figure 9:
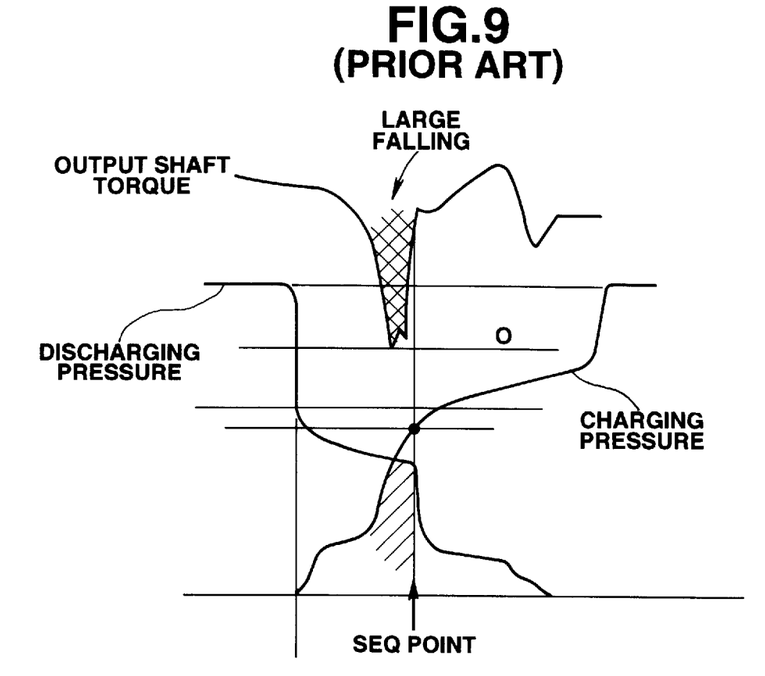
FIG. 9 is a time chart which shows transient characteristics of an output shaft torque, a turbine rotation speed, a charging pressure, and a discharging pressure of the conventional apparatus during the 2-3 up-shift, where a switching point of a sequence valve is tuned to an interlock side.
Figure 10:
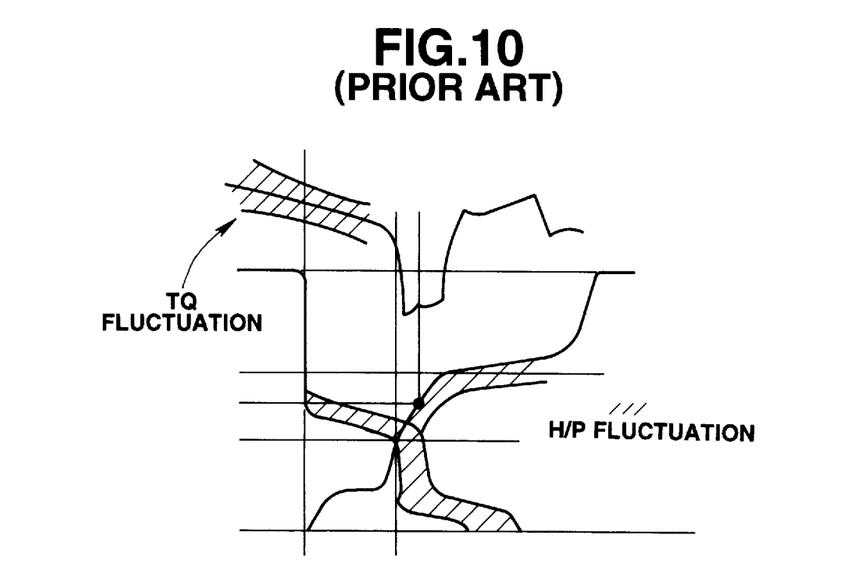
FIG. 10 is a time chart which shows transient characteristics of an output shaft torque, a turbine rotation speed, a charging pressure, and a discharging pressure of the conventional apparatus during the 2-3 up-shift, where a switching point of a sequence valve is tuned to a close side of the engine racing.

However, if the low clutch sequence valve 90 is tuned so as to be switched at a position where the charging pressure and the discharging pressure are overlapped in an interlock condition, the falling of the output shaft torque during the inertia phase starting period becomes large as shown in FIG. 9 and therefore large shock is generated. On the other hand, if the low clutch sequence valve 90 is tuned so as to be switched at a position where the charging pressure and the discharging pressure are slightly overlapped, the engine racing is generated due to the shortage of the engagement capacity during the inertia phase starting period. Therefore, in order to ensure both of preventing the engine racing and reducing the engagement shock, it is necessary to switch the low clutch sequence valve 90 at a timing just before the generation of the engine racing. However, the charging pressure, the discharging pressure and the output shaft torque are fluctuated according to the condition of each shift change operation. Therefore, even if the low clutch sequence valve 90 is tuned so as to be switched at the timing just before the generation of the engine racing as shown in FIG. 10, the engine racing is still generated. Therefore, the low clutch sequence valve 90 is tuned so as to be switched at a position where the switching point is slightly shifted to the interlock condition. However, even by this arrangement, since the hydraulic pressure or output shaft torque is fluctuated, it is difficult to stably and smoothly execute the up-shift without the generation of falling of the output shaft torque or engine racing.

SUMMARY OF THE INVENTION

It is an object of the present invention to provide an improved up-shift control apparatus of an automatic transmission which apparatus prevents the engine racing by a back pressure control of an accumulator installed to a friction element to be disengaged during an up-shift of the automatic transmission.

Figure 1:
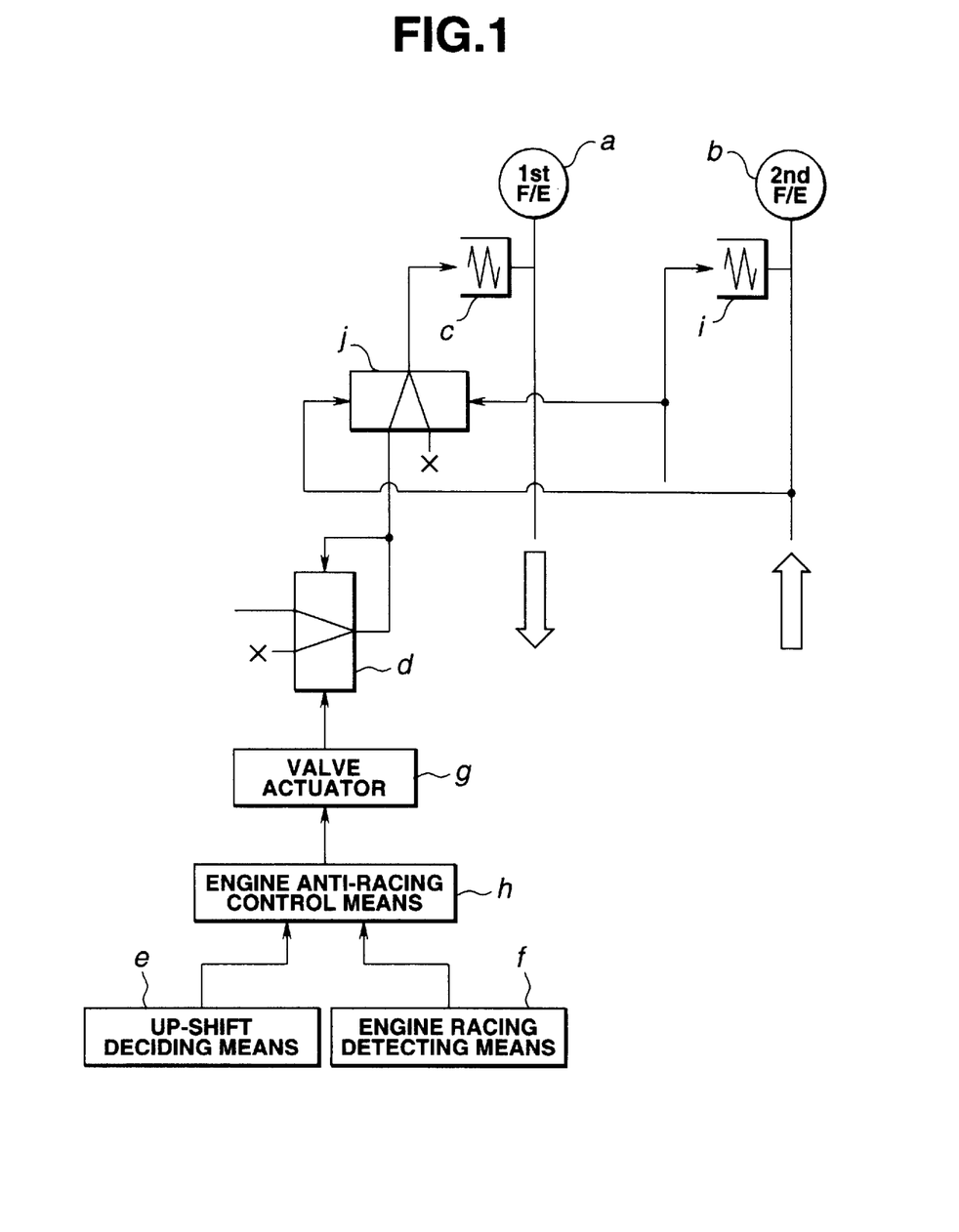
FIG. 1 is a schematic structural view which shows a structure of an up-shift control apparatus of an automatic transmission according to the present invention.

In brief, the above object is achieved by an up-shift control apparatus shown in FIG. 1, which is installed to an automatic transmission arranged to execute an up-shift by disengaging a first friction element a and by engaging a second friction element b. The up-shift control apparatus comprises a first accumulator c disposed in a hydraulic passage connected to the first friction element a, an accumulator control valve d generating hydraulic pressure to a back pressure chamber of the first accumulator c, an up-shift deciding means e for deciding whether the up-shift is executed, an engine racing detecting means f for detecting engine racing during the up-shift, an engine racing preventing means h for outputting a command for temporally increasing the hydraulic pressure of the back chamber of the accumulator to a valve actuator g. Therefore, in case that the engine racing is generated due to the shortage of engagement capacity caused by rapid decrease of a discharging pressure of the first friction element, by temporally increasing the hydraulic pressure of the back pressure chamber of the first accumulator c, the engagement pressure of the first friction element is temporally increased, and the engagement capacity of the first friction element is ensured to suppress the engine racing.

More specifically, an aspect of the present invention is deemed to come in an up-shift control apparatus of an automatic transmission, the automatic transmission including first and second friction elements and executing an up-shift by disengaging the first friction element and engaging the second friction element, said up-shift control apparatus comprising: a first accumulator including a back pressure chamber and being hydraulically connected to the first friction element; an accumulator control valve generating hydraulic pressure supplied to the back pressure chamber of said first accumulator; an up-shift decision means for deciding whether the up-shift operation is executed; an engine racing detecting means for detecting engine racing in the up-shift; a valve actuator connected to said accumulator control valve; and an engine anti-racing control means for outputting a command for temporally increasing the accumulator back pressure to said valve actuator when the engine racing is detected after the decision of the up-shift.

DETAILED DESCRIPTION OF THE INVENTION

Referring to FIGS. 2 to 8, there is shown an embodiment of an up-shift control apparatus of an automatic transmission according to the present invention.

Figure 2:
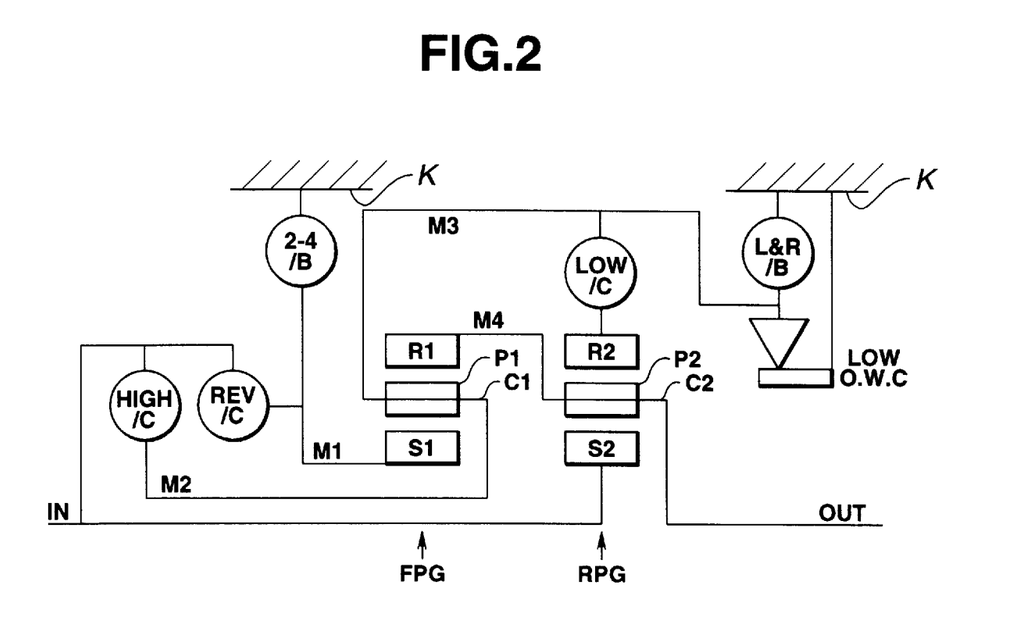
FIG. 2 is a schematic view of a power transmission mechanism of the automatic transmission applied to the up-shift control apparatus of FIG. 1.

FIG. 2 shows the automatic transmission to which the up-shift control apparatus is applied. The automatic transmission comprises an input shaft IN, an output shaft OUT, a front planetary gear unit FPG, and a rear planetary gear unit RPG. The front planetary gear unit FPG includes a first sun gear S1, a first ring gear R1, a first pinion P1 and a first pinion carrier C1. The rear planetary gear unit RPG includes a second sun gear S2, a second ring gear R2, a second pinion P2 and a second pinion carrier C2. Further, the automatic transmission includes a reverse clutch REV/C (hereinafter, call as R/C), a high clutch HIGH/C (hereinafter, call as H/C), a 2-4 brake 2-4/B, a lower clutch LOW/C (hereinafter, call as L/C), a low and reverse brake L&R/B, and a low one way clutch LOW O.W.C.

The first sun gear S1 is interconnected with the input shaft IN through a first rotation member M1 and the reverse clutch R/C, and is interconnected with a case K through the first rotation member M1 and the 2-4 brake 2-4/B. The first pinion carrier C1 is interconnected with the input shaft IN through a second rotation member M2 and the high clutch H/C, and is interconnected with the case K through a third rotation member M3 and the low & reverse brake L&R/B. The first pinion carrier C1 is interconnected with the second ring gear R2 through the third rotation member M3 and the low clutch L/C. The low & reverse brake L&R/B and the low one way clutch LOW O.W.C are arranged in tandem.

The first ring gear R1 is directly connected with the second pinion carrier C2 through a fourth rotation member M4, and the output shaft OUT is directly connected with the second pinion carrier 2C. The second sun gear S2 is directly connected with the input shaft IN.

This automatic transmission is arranged to eliminate a one way clutch for obtaining a smooth shift change during 4-3 up-shift and a clutch which was necessarily used to ensure engine brake according to the installation of the one way clutch. Therefore, the number of friction elements of this automatic transmission is decreased and the size thereof is decreased.

Figure 3:
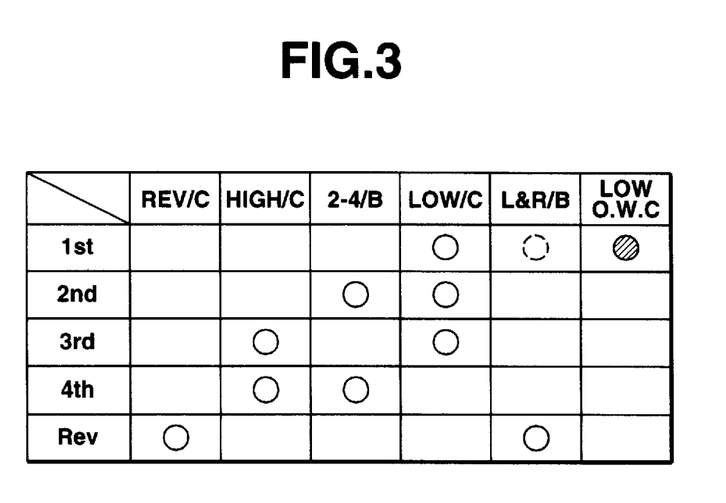
FIG. 3 is a table which shows engagement logic of friction elements of the automatic transmission of FIG. 2 with the selected shift range of the automatic transmission.

FIG. 3 shows an engagement logic for obtaining four forward speeds and one reverse speed by this automatic transmission.

First speed ($1^{st}$ speed) is obtained by the hydraulic engagement of the low clutch L/C, and one of the hydraulic engagement of the low & reverse clutch L&R/C and the mechanical engagement of the low one way clutch LOW O.W.C. Therefore, in the first speed of the automatic transmission, the second sun gear 2S functions as an input, the second ring gear 2R is fixed, and the second carrier 2C functions as an output.

Second speed ($2^{nd}$ speed) is obtained by the hydraulic engagement of the low clutch L/C and the 24 brake 2-4/B.

Therefore, the second sun gear 2S functions as an input, the first ring gear 1R is fixed, and the second carrier 2C functions as an output.

Third speed ($3^{rd}$ speed) is obtained by the hydraulic engagement of the high clutch H/C and the low clutch L/C. The second ring gear 2R and the second sun gear 2S simultaneously function as input, the second carrier 2C functions as output. The third speed establishes gear ratio=1.

Fourth speed ($4^{th}$ speed) is obtained by the hydraulic engagement of the high clutch H/C and the 2-4 brake 2-4/B. That is, the first pinion carrier 1C and the second sun gear 2S function as input, the first sun gear 1S is fixed, and the second pinion carrier 2C functions as output. Therefore, an overdrive shift position is established.

Reverse speed (Rev. speed) is obtained by the hydraulic engagement of the reverse clutch REV/C and the low and reverse brake L&R/B. That is, the first and second sun gears 1S and 2S function as input, the first pinion carrier 1C is fixed, and the second carrier 2c functions as output.

The 2-4 brake 2-4/B is a multi-plate brake type whose structure is as same as that of a multi-plate clutch.

Figure 4:
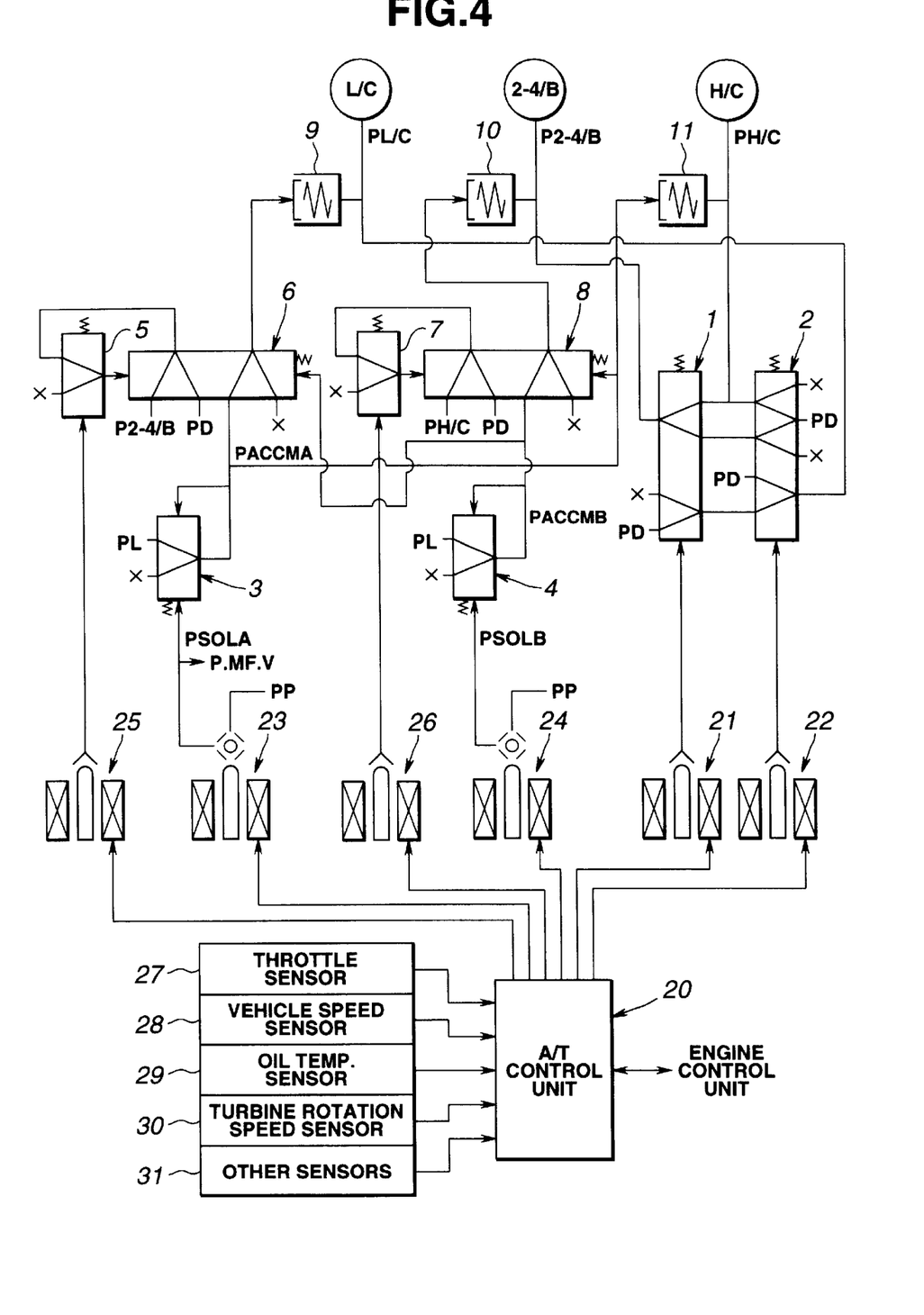
FIG. 4 is a system view of a hydraulic pressure control section and an electronic control section of the automatic transmission to which the up-shift control apparatus of a first embodiment is applied.
Figure 5:
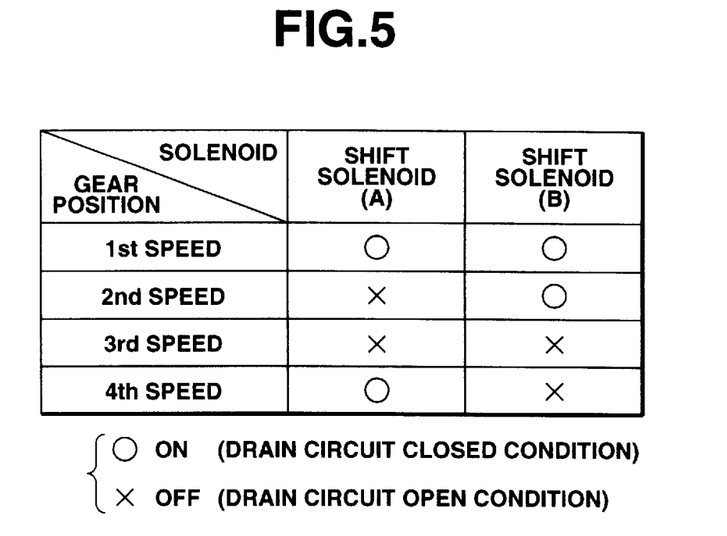
FIG. 5 is a table which shows an operating condition of shift solenoid valves of the hydraulic pressure control apparatus of the first embodiment.

FIG. 4 shows a control system for establishing the above-mentioned D-range $1^{st}$ to $4^{th}$ speeds wherein friction elements, a control valve section and an electronic control section are included. Such friction elements are the low clutch L/C, the 2-4 brake 2-4/B and the high clutch H/C. The control valve section includes a first shift valve 1, a second shift valve 2, a first accumulate control valve 3, a second accumulate control valve 4, a low clutch timing valve 5, a low clutch timing valve 5, a low clutch sequence valve 6, a 2-4 brake timing valve 7, 2-4 brake sequence valve 8, a low clutch accumulator 9, a 2-4 brake accumulator 10 and a high clutch accumulator 11.

The first shift valve 1 and the second shift valve 2 executes switching operations for changing shift position among $1^{st}$ speed to $4^{th}$ speed (OD) according to the operation of a first shift solenoid 21 and a second shift solenoid 22.

The first accumulate control valve 3 controls a first accumulate control pressure $P_{ACCMA}$ by decreasing a line pressure $P_L$ according to a magnitude of a first solenoid pressure $P_{SOLA}$ created by a line pressure duty solenoid 23. The first solenoid pressure $P_{SOLA}$ created by the line pressure duty solenoid 23 is supplied a pressure modifier valve which controls a modifier pressure functioning as a signal pressure of the line pressure $P_L$ created by a pressure regulator valve (not shown).

The second accumulate control valve 4 controls the second accumulate control pressure $P_{ACCMB}$ by decreasing the line pressure $P_L$ according to the magnitude of the second solenoid pressure $P_{SOLB}$ generated by a 2-4/B duty solenoid 24.

The low clutch timing valve 5 is of a selector valve and functions to set the signal pressure passage at a drain side when the low clutch timing solenoid 25 is turned OFF. The low clutch timing valve 5 further functions to set the signal pressure passage at a communication side when the low clutch timing solenoid 25 is turned ON.

The low clutch sequence valve 6 executes a back pressure control of the low clutch accumulator 9 when an up-shift to $4^{th}$ speed is executed or when the down-shift from $4^{th}$ speed is executed.

The 2-4 brake timing valve 7 is of a selector valve and functions to set the signal pressure passage at a drain side when the 2-4 brake timing valve 7 is turned OFF. The low clutch timing valve 5 further functions to set the signal pressure passage at a communication side when the 2-4 brake timing valve 7 is turned ON.

The 2-4 brake sequence valve 8 executes a back pressure control of the low clutch accumulator 9 when an up-shift to $3^{rd}$ speed is executed or when the down-shift from $3^{rd}$ speed is executed.

The first accumulator control pressure $P_{ACCMA}$ is led to a back pressure chamber of the low clutch accumulator 9 through the low clutch sequence valve 6 so as to smoothen the engagement and disengagement of the low clutch L/C.

The second accumulator control pressure $P_{ACCMB}$ is led to a back pressure chamber of the 2-4 brake accumulator 10 through the 2-4 brake sequence valve 8 so as to smoothen the engagement and disengagement of the 2-4 brake 2-4/B.

The first accumulate control pressure $P_{ACCMA}$ is directly led to a back pressure chamber of the high clutch accumulator 10 to smoothen the engagement and disengagement of the high clutch H/C.

The electronic control section of FIG. 4 includes a first shift solenoid 21, a second shift solenoid 22, a line pressure duty solenoid 23, a 2-4/B duty solenoid 24, a low clutch timing solenoid 25 and a 2-4/B timing solenoid 26 as an actuator for controlling a hydraulic pressure according to a drive command from an A/T (automatic transmission) control unit 20.

The A/T control unit 20 is connected with a throttle sensor 27 for detecting a throttle opening degree, a vehicle speed sensor 28 for detecting a vehicle speed, a turbine sensor 29 for detecting a turbine rotation speed of the automatic transmission, an oil temperature sensor 30 for detecting a temperature of the oil of the automatic transmission, and other sensors 31. These sensors 27 to 31 supply various information to the A/T control unit 20.

Figure 6:
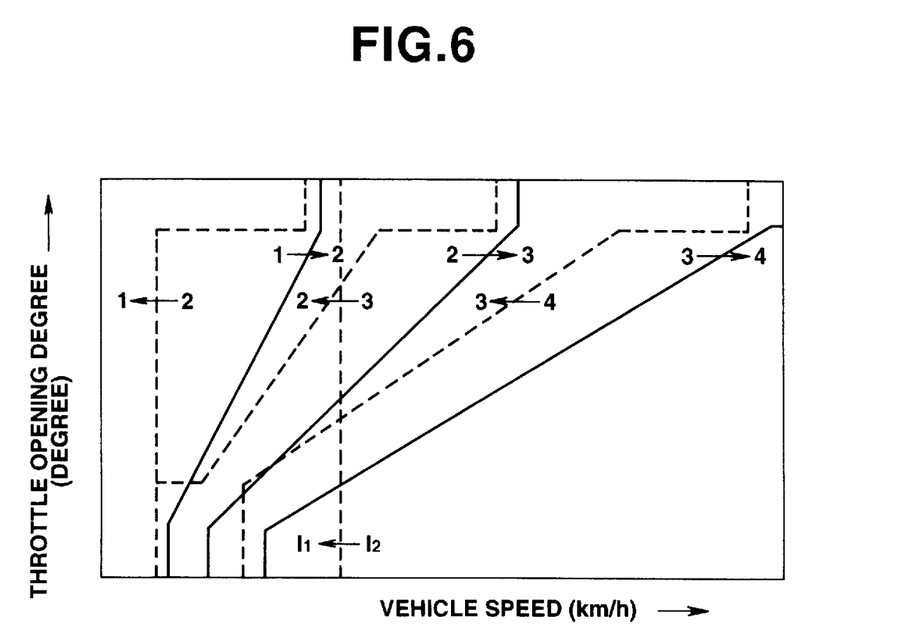
FIG. 6 is a graph which shows shift change characteristics of the hydraulic pressure control apparatus of the first embodiment.

The shift change control for automatically shifting among $1^{st}$ speed to $4^{th}$ speed under the D-range shift position is executed on the basis of the throttle opening degree and the vehicle speed in accordance with a shift change characteristic model of FIG. 6. That is, when the condition of the throttle opening degree and the vehicle speed on FIG. 6 crosses the shift change line of up-shift and down-shift, the shift change command is outputted from the A/T control unit 20. More particularly, according to the shift change command, next shift position of the automatic transmission is determined. In order to set the automatic transmission to the determined shift position, The A/T control unit 20 outputs a control signal to the first shift solenoid 21 and the second shift solenoid 22 according to the shift solenoid operation table of FIG. 5 so as to turn ON or OFF them.

Next, the manner of operation of the automatic transmission will be discussed hereinafter.

[Electronic control operation for 2-3 up-shift]

Figure 7:
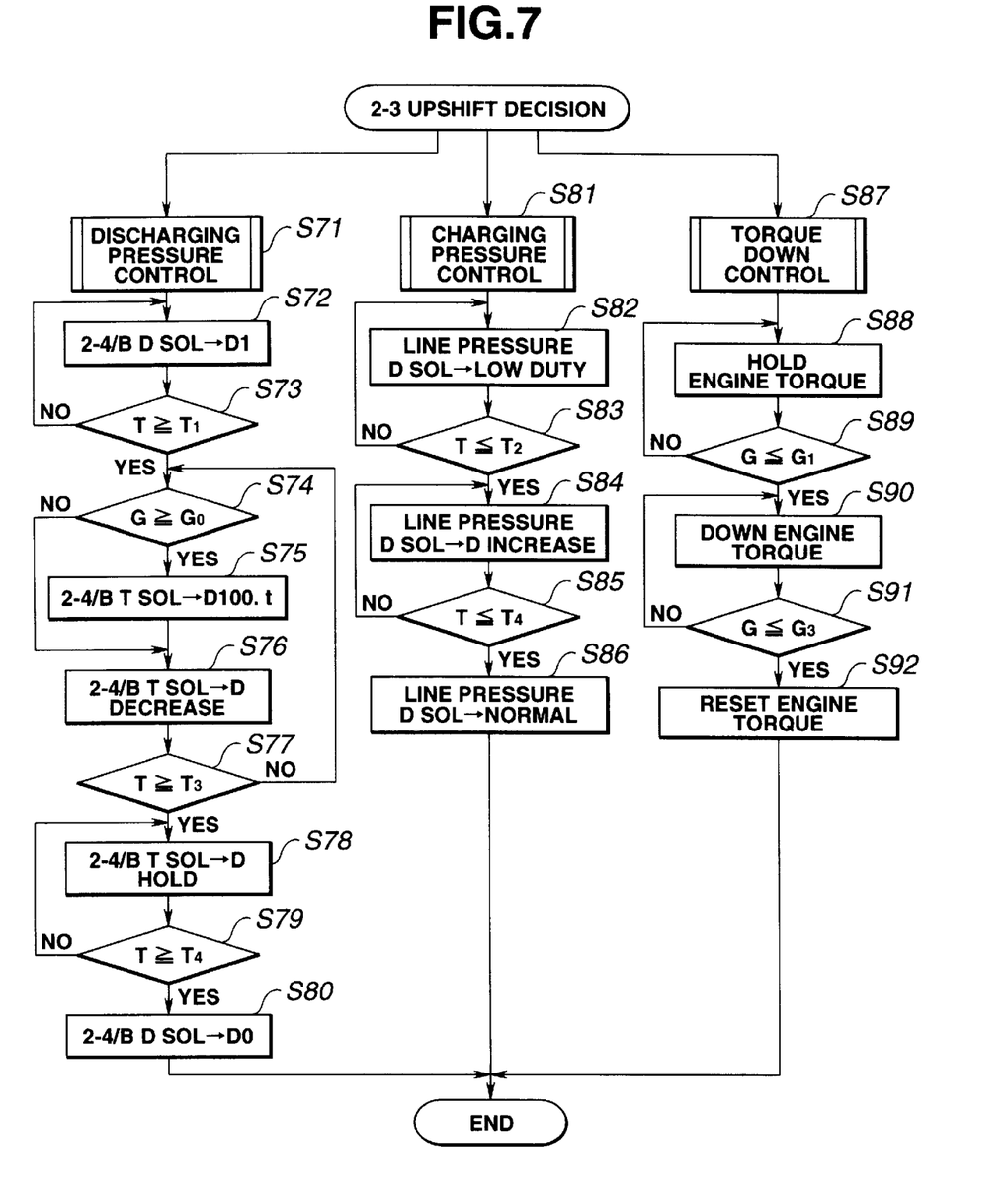
FIG. 7 is a flowchart which shows a procedure of the 2-3 up-shift control executed by an A/T control unit of the first embodiment.

Referring to FIG. 7, the up-shift control operation procedure executed by the A/T control unit 20 during the 2-3 up-shift is shown in the form of a flowchart. The 2-3 up-shift is executed by disengaging the 2-4 brake 2-4/B (corresponding to the first friction element a of FIG. 1) and by engaging the high clutch H/C (corresponding to the second friction element b of FIG. 1).

First, the A/T control unit 20 decides as to whether the automatic transmission is executing the 2-3 up-shift or not. This decision is executed by detecting the 2-3 up-shift command signal generated when a point on the shift change point model characteristic of FIG. 6 crosses the 2-3 up-shift line. This decision process corresponds to the up-shift decision means e of FIG. 1.

When the A/T control unit 20 decides that the 2-3 up-shift is now executed, a timer value T for counting an elapsed time from this decision is incremented, and the necessary information such as the throttle opening degree TH is read.

When the A/T control unit 20 decides that the 2-3 up-shift is now executed, the A/T control unit 20 reads the vehicle speed (transmission output shaft rotation speed) from the vehicle speed sensor 28 and the turbine rotation speed (transmission input shaft rotation speed) from the turbine sensor 29, and calculates an actual gear ratio G. Further, the A/T control unit 20 executes a shift change control for switching the command to the second shift solenoid 22 from ON to OFF while the command to the first shift solenoid 21 is kept OFF. In addition, when the A/T control unit 20 decides that the 2-3 up-shift is executed, the discharging pressure control which is executed in steps S71 to S80, the charging pressure control which is executed in steps S81 to S86 and the torque down control which is executed in steps S87 to S92, are executed, respectively.

(1) Discharging pressure control

At a step S72, the A/T control unit 20 outputs a command signal indicative of a duty ratio D1(<DO; initial duty ratio) to the 2-4/B duty solenoid 24 (corresponding to the valve actuator g of FIG. 1).

At a step S73, the A/T control unit 20 decides as to whether the timer value T is greater than or equal to a first preset timer value T1 or not. The first preset timer value T1 is set to a minimum time period necessary for starting the discharge shelf pressure at the starting of the shift change. When the decision at the step S73 is YES, the routine proceeds to a step S74. When the decision at the step S73 is NO, the routing returns to the step S72.

At the step S74, the A/T control unit 20 decides as to whether the actual gear ratio G represented by the count value is greater than or equal to a racing decision threshold value GO obtained by adding 1 count value to the count value of the second speed gear ratio. This step S74 corresponds to the engine racing detecting means f of FIG. 1. When the decision at the step S74 is YES, the routine proceeds to a step S75. When the decision at the step S74 is NO, the routine jumps to a step S76.

At the step S75, the A/T control unit 20 outputs the command representative of the 100% duty ratio to the 2-4/B duty solenoid 24 for a preset time period t. The step S75 corresponds to the engine racing preventing means f of FIG. 1.

After the execution of the step S75, the routine proceeds to the step S76 wherein the A/T control unit 20 outputs the command for gradually decreasing the duty ratio with the lapse of time to the 2-4 timing solenoid 26.

At a step S77, the A/T control unit 20 decides as to whether the timer value T is greater than or equal to a third preset timer value $T_3$ or not. The third preset timer value $T_3$ is set to a time period till just before the end of inertia phase. Therefore, it will be understood that the step S77 may be arranged to decide as to whether the actual gear ratio G is smaller than or equal to a second preset gear ratio $G_2$ indicative of the gear ratio just before the finish of the inertia phase. When the decision at the step S77 is YES, the routine proceeds to a step S78. When the decision at the step S77 is NO, the routine returns to the step S74.

At the step S78, the A/T control unit 20 outputs the command for holding the decreased duty ratio to 2-4/B duty solenoid 24.

At a step S79, the A/T control unit 20 decides as to whether the timer count value T is greater than or equal to the shift change finished timer count value $T_4$ or not. When the decision at the step S79 is YES, the routine proceeds to a step S80. When the decision at the step S79 is NO, the routine returns to the step S78.

At the step S80, the A/T control unit 20 outputs the command for resetting the duty ratio to the initial duty ratio $D_0$ before the shift change to the 2-4/B duty solenoid 24. Then, the routine proceeds to End.

(2) Charging pressure control

At a step S82, the A/T control unit 20 outputs a command signal indicative of a low duty ratio to the line pressure duty solenoid 23.

At a step S83, the A/T control unit 20 decides as to whether the timer value T is greater than or equal to a second preset timer value $T_2$ or not. The second preset timer value $T_2$ is a value generally similar to the switching timing of the 2-4 brake sequence valve 8 (corresponding to sequence valve j of FIG. 1). When the decision at the step S83 is YES, the routine proceeds to a step S84. When the decision at the step S83 is NO, the routine returns to the step S82.

At the step S84, the A/T control unit 20 outputs a command signal for gradually increasing the duty ratio by a predetermined gradient to the line pressure duty solenoid 23.

At a step S85, the A/T control unit 20 decides as to whether the timer count value T is greater than or equal to the shift change finish timer value $T_4$ or not. When the decision at the step S85 is YES, the routine proceeds to a step S86. When the decision at the step S85 is NO, the routine returns to the step S84.

At the step S86, the A/T control unit 20 outputs a command signal for resetting the duty ratio to the duty ratio for executing the normal line pressure control according to the throttle opening degree to the line pressure duty solenoid 23. Then, the routine proceeds to End of the routine.

(3) Torque down control

At a step S88, the A/T control unit 20 holds the engine torque as it is.

At a step S89, the A/T control unit 20 decides as to whether the actual gear ration G is smaller than or equal to the first preset gear ratio G1. When the decision at the step S89 is YES, the routine proceeds to a stat the When the decision at the step S89 is NO, the routine returns to the step S88.

At the step S90, the A/T control unit 20 outputs a command signal for suppressing the engine torque at a low condition. In case that the torque down control is executed by controlling the throttle valve, the throttle valve is fully closed in reply to the command signal. In case that the torque down control is executed by controlling the supply of fuel, a fuel cut control is executed so as to cut the supply of fuel to each cylinder or selected cylinder.

At a step S91, the A/T control unit 20 decides as to whether the actual gear ratio G is smaller than or equal to the third preset gear ratio $G_3$ or not, where $G_3$ is smaller that $G_3$. When the decision at the step S91 is YES, the routine proceeds to a step S92. When the decision at the step S91 is NO, the routine returns to the step S90.

At the step S92, the A/T control unit 20 outputs a command signal for resetting the engine torque to the initial value.

During the up-shift operation, ON command is outputted to the 2-4/B timing solenoid 26 and the low clutch timing solenoid 25.

[2-3 up-shift control operation]

Figure 8:
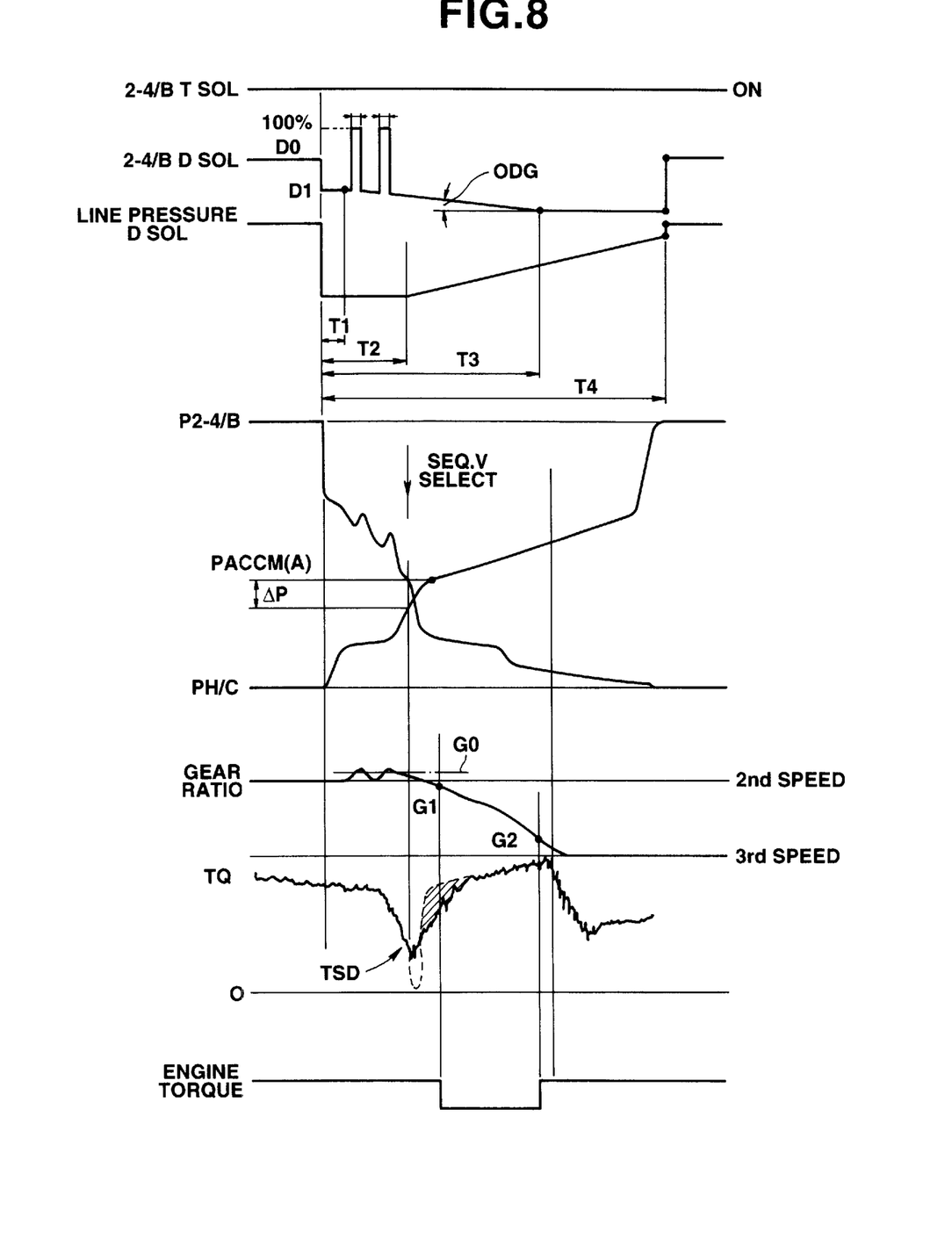
FIG. 8 is a time chart which shows transient characteristics of a control command, a hydraulic pressure, a gear ratio, an output shaft torque of the first embodiment during the 2-3 up-shift.

On the basis of the time chart of FIG. 8, the manner of operation of the 2-3 up-shift control in the medium to high throttle opening degree will be discussed hereinafter.

When the 2-3 up-shift is executed according to the increase of the vehicle speed due to the depression of an acceleration pedal, the command to the second shift solenoid 22 is changed from ON to OFF. Therefore, the hydraulic passage to the high clutch H/C switched from the drain side to the D-range pressure supply side, and the hydraulic passage to the 2-4 brake 2-4/B is switched from the D-range pressure supply side to the drain side.

The discharging pressure control from the 2-4 brake 2-4/B in the shift change transient condition is executed by a back pressure control of the 2-4 brake accumulator 10 (corresponding to the first accumulator c of FIG. 1) disposed in the hydraulic passage to the 2-4 brake 2-4/B.

The charging pressure control to the high clutch H/C in the shift change transient condition is executed by a back pressure control of the high clutch accumulator 11 (corresponding to the second accumulator i of FIG. 1) disposed in the hydraulic passage to the high clutch H/C.

The torque down control in the shift change transient condition is executed by outputting a control command from the A/T control unit 20 to the engine control unit.

(1) Discharging pressure control operation

During 2-3 up-shift, since the high clutch pressure $P_{H/C}$ which is an operation signal pressure of the 2-4 timing valve 7 and the 2-4 brake sequence valve 8 is switched to the communication state. The 2-4 brake sequence valve 8 supplies the second accumulator control pressure $P_{ACCMB}$ generated by the second accumulator control valve 4 (corresponding to the accumulator control valve d of FIG. 1) to the 2-4 brake accumulator 10 until the difference pressure $\Delta P$ between the first accumulator control pressure $P_{ACCMA}$ and the high clutch pressure $P_{H/C}$ becomes the predetermined pressure difference.

Therefore, in case that the engine racing is generated before the switching of the 2-4 brake sequence valve 8, the initial state of the engine racing is detected by the increase of the gear ratio and the A/T control unit 20 outputs the command signal indicative of the 100% duty ratio to the 2-4 duty solenoid 24 for a preset time t on the basis of the detection of the initial state of the engine racing. Therefore, the hydraulic pressure of the back pressure chamber of the 2-4 brake accumulator 10 is temporally increased and the discharging pressure from the 2-4 brake pressure $P_{2-4/B}$ is increased. This derives the automatic transmission into the interlock condition so as to prevent the large engine racing.

Further, when the pressure difference $\Delta P$ between the first accumulator control pressure $P_{ACCMA}$ and the high clutch pressure $P_{H/c}$ becomes the preset pressure difference, the 2-4 brake sequence valve 8 is switched from a supply side for supplying the back pressure to the 2-4 brake accumulator 10 to the drain side for draining the back pressure from the 2-4 brake accumulator 10.

Therefore, the discharging pressure of the 2-4 brake pressure $P_{2-4/B}$ is radically decreased in accordance with the radical decrease of the hydraulic pressure of the back pressure chamber of the 2-4 brake accumulator 10. This prevents the interlock caused by the overlapping of the charging pressure and the discharging pressure. Therefore, the decrease of the output shaft torque TQ at the initial state of the inertia phase is suppressed.

That is to say, the tuning of the switching timing of the 2-4 brake sequence valve 8 may be relied on the engine anti-racing control where the discharging pressure is increased to suppress the engine racing. This enables to execute the tuning of the switching timing of the 2-4 brake sequence valve 8 only taking account of decreasing the engagement shock. Therefore, the degree of freedom as to the tuning is increased.

Next, the positive usage and the negative usage of the engine anti-racing control will be discussed.

As a negative usage of the engine anti-racing control, for example, in case that the decreasing gradient of the command to the 2-4/B duty solenoid valve 24 is decreased and the tuning is executed so as to switch the 2-4 brake sequence valve 8 by slightly offsetting it to the interlock side, the racing is prevented even if the engine racing due to the dispersion of the hydraulic pressure and the output shaft torque may be generated.

As a positive usage of the engine anti-racing control, for example, in case that the decrease gradient of the command to the 2-4/B duty solenoid 24 is increased and the tuning is executed so as to switch at a timing close to (just before) the engine racing, it becomes possible to ensure both of the preventing of the engine racing and the decrease of the engagement shock through the suppression of the drawing of the output shaft torque TQ.

The method for detecting the engine racing will be discussed hereinafter.

When the 2-3 up-shift is executed, as far as the engine racing is not generated, the second speed gear ratio is held, and then the gear ratio is gradually changed to the third speed gear ratio after the 2-3 up-shift. Accordingly, when the actual gear ratio G represented by the count value becomes greater than or equal to the racing threshold value G0 obtained by adding 1 count value to the count value of the second speed gear ratio, that is, when the actual gear ratio G calculated during the up-shift becomes increased, it is decided that the engine racing is generated. Therefore, in the event that the engine racing is generated, the engine racing is detected at a timing of an initial state of the racing. This ensures the practical advantage of the engine anti-racing control.

(2) Charging pressure control operation

In a time period from the start of the up-shift to the second preset timer value $T_2$ of the inertia starting period, the command for commanding the low duty ratio is outputted to the line pressure duty solenoid 23 and therefore the first accumulator control pressure controlled in low pressure is supplied to the back pressure chamber of the high clutch accumulator 11. Accordingly, the high clutch pressure $P_{H/C}$ is gradually increased to the accumulator back pressure level after it passes the clutch piston range, as shown by the characteristic curve of the high clutch pressure $P_{H/C}$ of FIG. 8.

In a time period from the second preset timer value $T_2$ to the shift change finished timer value $T_4$, the command for gradually increasing the duty ratio is outputted to the line pressure duty solenoid 23. Therefore, the gradually increased first accumulator control pressure $P_{ACCMA}$ is supplied to the back pressure chamber of the high clutch accumulator 11. Accordingly, the high clutch pressure $P_{H/C}$ is gradually increased as shown by the $P_{H/C}$ characteristic line of FIG. 8.

(3) Torque down control operation

In the inertia phase range from the first preset gear ratio $G_1$ to the third preset gear ration $G_3$, the engine is controlled so as to decrease the engine torque. Therefore, the output shaft torque TQ in the inertia phase range is decreased.

Next, the advantages gained by the above mentioned control operations will be discussed.

(1) The automatic transmission is provided with the 2-4 brake accumulator 10 which is disposed in the hydraulic passage to the 2-4 brake pressure $P_{2-4/B}$ disengaged by the 2-3 up-shift and the second accumulator control valve 4 which generates the hydraulic pressure to the back pressure chamber of the 2-4 brake accumulator 10. The up-shift control apparatus of the automatic transmission is arranged such that the command for supplying 100% duty is outputted to the 2-4/B duty solenoid 24 for the preset time t when it is decided that the actual gear ratio G represented by the count value is greater than or equal to the racing decision threshold $G_0$ (obtained by adding 1 count value to the count value of the second speed gear ratio. Therefore, during the 2-3 up-shift, the accumulator back pressure increasing control of the discharging pressure side is executed and therefore the engine anti-racing is achieved.

(2) The high clutch accumulator 11 is disposed in the hydraulic passage connected to the high clutch H/C which is engaged during the 2-3 up-shift. The 3-4 brake sequence valve 8 for switching the back pressure of the 3-4 brake accumulator 10 from the supply side to the drain side when the pressure difference $\Delta P$ between the first accumulator control pressure $P_{ACCMA}$ and the high clutch pressure $P_{H/C}$ becomes the preset pressure difference, is disposed between the high clutch accumulator 11 and the second accumulator control valve 4. Therefore, it becomes possible to improve the degree of freedom as to the tuning of the switching timing of the 2-4 brake sequence valve 8 with the achievement of the engine anti-racing by means of the back pressure increasing control of the discharging pressure side accumulator.

(3) The engine racing detecting means is arranged to decide the engine racing when the actual gear ratio G represented by the count value is greater than the racing decision threshold value $G_0$ obtained by adding one count value to the count value of the second speed gear ratio. Therefore, it is possible to quickly detect the engine racing so as to ensure the advantage of the engine anti-racing.

Although the embodiment of the present invention has been shown and described such that the up-shift control is applied to the 2-3 up-shift, this control may be applied to the 3-4 up-shift where the lower clutch L/C is disengaged and the 2-4 brake 2-4/B is engaged. In this case, the back pressure of the low clutch accumulator 9 is controlled by the low clutch sequence valve 6. If the automatic transmission is of a fifth speed type, this up-shift control may be applied to the 4-5 up-shift.

While the first embodiment has been shown and described such that the detection of the engine racing is executed by monitoring the gear ratio, it will be understood that the detection of the engine racing may be executed by monitoring the engine rotation speed or turbine rotation speed during the up-shift.

The entire disclosure of Japanese Patent Application No. 8-202237 filed on Jul. 31, 1996 including specification, claims, drawings and summary are incorporated herein by reference in its entirety.

What is claimed is:

1. An up-shift control apparatus of an automatic transmission, the automatic transmission including first and second friction elements and executing an up-shift by disengaging the first friction element and engaging the second friction element, said up-shift control apparatus comprising:

a first accumulator including a back pressure chamber and being hydraulically connected to the first friction element;

an accumulator control valve generating hydraulic pressure supplied to the back pressure chamber of said first accumulator;

an up-shift decision means for deciding as to whether the up-shift operation is executed;

an engine racing detecting means for detecting engine racing during the up-shift;

a valve actuator connected to said accumulator control valve; and an engine anti-racing control means for outputting a command signal for temporally increasing the accumulator back pressure to said valve actuator when the engine racing is detected during the up-shift.

2. An up-shift control apparatus as claimed in claim 1, further comprising a second accumulator and a sequence valve, the second accumulator being disposed in a hydraulic passage connected to the second friction element, the sequence valve being disposed between the first accumulator and the accumulator control valve and switching the back pressure of the first accumulator from a supply side to a drain side when the pressure difference between the back pressure of the second accumulator and the charging pressure of the second friction element becomes a preset pressure difference.

3. An up-shift control apparatus as claimed in claim 1, wherein said engine racing detecting means includes means for deciding that the engine racing is generated when the gear ratio during the up-shift is increasing.

4. An up-shift control apparatus of an automatic transmission, the automatic transmission including a first friction element to be disengaged in an up-shift of the automatic transmission and a second friction element to be engaged in the up-shift, said up-shift control apparatus comprising:

a first accumulator having a back pressure chamber and being fluidly connected to the first friction element;

an accumulator control valve generating hydraulic pressure supplied to the back pressure chamber of said first accumulator;

a duty solenoid actuating a set condition of said actuator control valve;

an automatic transmission control unit arranged to decide as to whether the up-shift operation is executed, to detect engine racing in the up-shift, and to output a command signal to said duty solenoid when the engine racing is detected after the decision of the up-shift, the command signal functioning so as to temporally increase the hydraulic pressure to be supplied to the back pressure chamber of said first accumulator.

5. An up-shift control apparatus as claimed in claim 4, further comprising a sensor unit which includes a throttle sensor, a vehicle speed sensor, an oil temperature sensor for detecting a temperature of oil of the automatic transmission, a turbine rotation speed sensor.

6. An up-shift control apparatus as claimed in claim 5, wherein said automatic transmission control unit calculates a gear ratio during the up-shift on the basis of the sensor unit and decides that the engine racing is generated when the calculated gear ratio is increased.

* * * * *